United States Patent
Lee et al.

(10) Patent No.: US 7,951,438 B2
(45) Date of Patent: May 31, 2011

(54) BIAXIALLY ORIENTED POLYLACTIC ACID FILM WITH HIGH BARRIER

(75) Inventors: Mark S. Lee, North Kingstown, RI (US); Keunsuk P. Chang, North Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 0 days.

(21) Appl. No.: 12/332,153

(22) Filed: Dec. 10, 2008

(65) Prior Publication Data

US 2009/0148713 A1    Jun. 11, 2009

Related U.S. Application Data

(60) Provisional application No. 61/012,645, filed on Dec. 10, 2007.

(51) Int. Cl.
*B32B 15/085* (2006.01)
*B32B 27/08* (2006.01)
*B32B 27/32* (2006.01)
*B32B 27/36* (2006.01)
*B32B 37/15* (2006.01)

(52) U.S. Cl. ............. 428/35.8; 428/35.7; 428/36.6; 428/457; 428/461; 428/480; 428/483; 428/515; 428/516; 428/520; 428/522; 428/523; 427/585; 427/123; 156/244.11; 156/244.24; 264/173.11; 264/173.12; 264/173.16; 264/173.19

(58) Field of Classification Search .................... None
See application file for complete search history.

(56) References Cited

U.S. PATENT DOCUMENTS

| | | | | |
|---|---|---|---|---|
| 4,310,578 A | * | 1/1982 | Katsura et al. | 383/108 |
| 4,410,595 A | * | 10/1983 | Matsumoto et al. | 428/412 |
| 4,464,438 A | | 8/1984 | Lu | |
| 4,632,959 A | * | 12/1986 | Nagano | 525/70 |
| 4,828,920 A | * | 5/1989 | Nakabayashi et al. | 428/349 |
| 4,877,685 A | * | 10/1989 | Bergstrom et al. | 428/500 |
| 5,147,726 A | | 9/1992 | Suzuki et al. | |
| 5,153,074 A | | 10/1992 | Migliorini | |
| 5,155,160 A | | 10/1992 | Yeh et al. | |
| 5,175,054 A | | 12/1992 | Chu | |

(Continued)

FOREIGN PATENT DOCUMENTS

EP    1385700    7/2005

(Continued)

OTHER PUBLICATIONS

TAPPI Conference Presentation, May 2003, "Adhesive Properties of Ethylene-Acrylic Ester-Maleic Anhydride Terpolymers in Extrusion Coating/Lamination"; (27 pages).

(Continued)

*Primary Examiner* — Vivian Chen
(74) *Attorney, Agent, or Firm* — Morrison & Foerster LLP

(57) ABSTRACT

A metallized laminate film exhibiting improved moisture barrier property as well as maintaining a high bio-polymer content and degradability property is disclosed. The laminate film includes a first core layer of polylactic acid polymer and a second skin layer comprising a polyolefin metal receiving layer. The metal receiving layer or the core layer, or both, may be blended with an amount of polar-modified tie-resin to improve bonding. Alternatively, a discrete tie-resin layer may be interposed between the polyolefin metal receiving layer and the crystalline polylactic acid polymer core layer. The polyolefin metal receiving layer may be discharge-treated on the side opposite the core layer and metallized.

17 Claims, 2 Drawing Sheets

Example 1

U.S. PATENT DOCUMENTS

| | | | |
|---|---|---|---|
| 5,216,050 A * | 6/1993 | Sinclair | 524/108 |
| 5,443,780 A * | 8/1995 | Matsumoto et al. | 264/290.2 |
| 5,473,439 A | 12/1995 | Pappas | |
| 5,489,474 A * | 2/1996 | Shinoda et al. | 428/343 |
| 5,556,711 A * | 9/1996 | Ajioka et al. | 428/460 |
| 5,631,066 A * | 5/1997 | O'Brien | 428/195.1 |
| 5,731,093 A | 3/1998 | Chang et al. | |
| 5,849,374 A * | 12/1998 | Gruber et al. | 428/34.3 |
| 5,849,401 A * | 12/1998 | El-Afandi et al. | 428/215 |
| 5,908,918 A | 6/1999 | Chen et al. | |
| 6,005,068 A * | 12/1999 | Gruber et al. | 528/354 |
| 6,153,276 A * | 11/2000 | Oya et al. | 428/35.2 |
| 6,211,290 B1 * | 4/2001 | Xiao et al. | 525/70 |
| 6,248,430 B1 * | 6/2001 | Toyoda et al. | 428/213 |
| 6,312,823 B1 * | 11/2001 | El-Afandi et al. | 428/480 |
| 6,500,556 B1 * | 12/2002 | Morris et al. | 428/463 |
| 6,521,336 B2 * | 2/2003 | Narita et al. | 428/349 |
| 6,649,732 B2 * | 11/2003 | Kobayashi et al. | 528/354 |
| 6,713,175 B1 | 3/2004 | Terada et al. | |
| 6,808,795 B2 | 10/2004 | Noda et al. | |
| 6,844,077 B2 * | 1/2005 | Squier et al. | 428/457 |
| 7,128,969 B2 * | 10/2006 | Busch et al. | 428/337 |
| 7,214,414 B2 | 5/2007 | Khemani et al. | |
| 7,316,848 B2 * | 1/2008 | Longmoore | 428/516 |
| 7,354,973 B2 | 4/2008 | Flexman | |
| 7,368,160 B2 * | 5/2008 | Inglis | 428/212 |
| 7,390,558 B2 * | 6/2008 | Aritake et al. | 428/212 |
| 7,678,444 B2 | 3/2010 | Tedford, Jr. et al. | |
| 2001/0031348 A1 | 10/2001 | Jud et al. | 428/216 |
| 2002/0086940 A1 * | 7/2002 | Ota et al. | 525/74 |
| 2003/0039775 A1 * | 2/2003 | Kong | 428/34.9 |
| 2003/0199218 A1 * | 10/2003 | Mueller et al. | 442/394 |
| 2004/0096677 A1 * | 5/2004 | Imai et al. | 428/461 |
| 2004/0191541 A1 * | 9/2004 | Squier et al. | 428/458 |
| 2004/0258857 A1 * | 12/2004 | Dagan et al. | 428/32.6 |
| 2005/0098928 A1 * | 5/2005 | Rosenbaum et al. | 264/492 |
| 2005/0186414 A1 | 8/2005 | Su et al. | |
| 2006/0009611 A1 | 1/2006 | Hayes | |
| 2006/0019111 A1 * | 1/2006 | Sawai et al. | 428/480 |
| 2006/0257585 A1 | 11/2006 | Schiller et al. | |
| 2006/0257676 A1 | 11/2006 | Itada et al. | |
| 2007/0020448 A1 | 1/2007 | Hubbard et al. | |
| 2007/0098966 A1 | 5/2007 | Zhou | |
| 2007/0141372 A1 | 6/2007 | Su et al. | |
| 2008/0311813 A1 | 12/2008 | Ting et al. | |
| 2009/0148715 A1 | 6/2009 | Lee | |
| 2009/0171065 A1 | 7/2009 | Nakamura et al. | |
| 2010/0040904 A1 | 2/2010 | Cloutier et al. | |
| 2010/0151167 A1 | 6/2010 | Gohil | |

FOREIGN PATENT DOCUMENTS

| | | |
|---|---|---|
| EP | 1385899 | 2/2007 |
| EP | 2 065 178 | 6/2009 |
| EP | 2 133 382 | 12/2009 |
| JP | 2003-276144 * | 9/2003 |
| JP | 2004-82512 | 3/2004 |
| WO | WO-02/087877 | 11/2002 |
| WO | WO-02/088230 | 11/2002 |
| WO | WO 2004/016417 * | 2/2004 |
| WO | WO-2007/046174 | 4/2007 |
| WO | WO-2009/076458 | 6/2009 |
| WO | WO-2009/076541 | 6/2009 |
| WO | WO-2010/019944 | 2/2010 |

OTHER PUBLICATIONS

Product Literature Presentation, May 2005, "Lotader: Ultra Versatile Adhesives for Extrusion Coating and Extrusion Lamination Technologies"; (18 pages).

International Search Report and Written Opinion mailed on Feb. 6, 2009, directed to counterpart International Patent Application No. PCT/US2008/86261; 8 pages.

International Search Report mailed on Oct. 1, 2009 directed at international application No. PCT/US2009/054022; 12 pages.

International Search Report and Written Opinion mailed on Feb. 6, 2009, directed to related International Patent Application No. PCT/US2008/86450; 5 pages.

(2007) "Technology Focus Report: Toughened PLA," NatureWorks 1-5.

Priddy D. (2010). "Improving PLA mechanical properties by the addition of oil," Polymer Engineering and Science 50(3): 513-519.

Shichen Dou et al., U.S. Appl. No. 12/977,647, filed on Dec. 23, 2010; 59 pages.

Jiang, L. et al. (2006). "Study of Biodegradable Polylactide/Poly(butylene adipate-*co*-terephthalate) Blends." *Biomacromolecules*. 7(1):199-207.

International Search Report and Written Opinion mailed on Aug. 17, 2010, directed to counterpart International Patent Application No. PCT/US10/38848; 11 pages.

International Search Report and Written Opinion mailed on Sep. 1, 2010, directed to counterpart International Patent Application No. PCT/US2010/040185; 10 pages.

Shichen Dou et al., U.S. Appl. No. 12/814,802, filed Jun. 14, 2010; 35 pages.

Shichen Dou et al., U.S. Appl. No. 12/824,759, filed Jun. 28, 2010; 30 pages.

Tracy A. Paolilli et al., U.S. Appl. No. 12/890,349, filed Sep. 24, 2010; 50 pages.

Shichin Dou et al., U.S. Appl. No. 61/218,846, filed Jun. 19, 2009; 13 pages.

Biofilm S.A. "Prospect on PLA applications: Clear Barrier Technology" promotional literature presented at "Innovation Takes Root" by Nature Works, Las Vegas NV. Sep. 16-18, 2008; 16 pages.

\* cited by examiner

BIAXIALLY ORIENTED POLYLACTIC ACID FILM WITH HIGH BARRIER

CROSS-REFERENCE TO RELATED APPLICATION

This application claims the benefit of U.S. provisional application No. 61/012,645, filed on Dec. 10, 2007, the entire content of which is incorporated herein by reference.

FIELD OF THE INVENTION

This invention relates to a multi-layer biaxially oriented polylactic acid (BOPLA) film with a novel formulation which exhibits improved barrier properties, particularly for moisture vapor transmission barrier, after metallizing.

BACKGROUND OF THE INVENTION

Biaxially oriented polypropylene (BOPP) films used for packaging, decorative, and label applications often perform multiple functions. For example, in laminations they can provide printability, transparent or matte appearance, and/or slip properties. They can further be used to provide a surface suitable for receiving organic or inorganic coatings for gas and moisture barrier properties. They can also be used to provide a heat sealable layer for bag forming and sealing, or a layer that is suitable for receiving an adhesive either by coating or laminating.

However, in recent years, interest in "greener" packaging has been developing. Packaging materials based on biologically derived polymers are increasing due to concerns with renewable resources, raw materials, and greenhouse gases. Bio-based polymers are believed—once fully scaled-up—to help reduce reliance on petroleum, reduce production of greenhouse gases, and can be biodegradable. The biodegradable aspect is of interest to many snack manufacturers so as to provide litter abatement in addition to a lower carbon footprint package. Bio-based polymers such as polylactic acid (PLA)—which is currently derived from corn starch (but can be derived from other plant sugars) and thus, can be considered to be derived from a renewable or sustainable resource—is one of the more popular and commercially available materials available for packaging film applications. Other bio-based polymers such as polyhydroxyalkanoates (PHA) and particularly, polyhydroxybutyrate (PHB), are also of high interest.

There are several manufacturers of oriented PLA films, in particular biaxially oriented PLA, but none of them provides a satisfactory moisture barrier property when metallized. For example, Celplast Metallized Products, Ltd.'s Enviromet™ high barrier metallized PLA film typical data sheet describes a product that exhibits an oxygen barrier of 6.2 cc/m²/day (at 23° C., 50% relative humidity or RH) but a relatively poor moisture barrier of 3.1 g/m²/day (at 38° C., 90% RH) as compared to typical metallized biaxially oriented polypropylene films.

For such a bio-based polymer to be useful for snack food packaging applications, it is desirable that the bio-based polymer film match as many of the attributes possible that BOPP is well-known for, such as heat sealability, printability, controlled COF, metallizability, barrier, etc. In particular, for high barrier packaging, metallized oriented PLA films should demonstrate good oxygen and moisture barrier properties. For metallized oriented PLA in particular, good oxygen barrier property is generally easily achieved due to the polar nature of PLA, which provides good hydrogen-bonding of the polymer molecules. However, this polar nature tends to be detrimental for achieving high moisture barrier. Without being bound by any theory, the thought is that water molecules—being polar themselves—may more easily migrate through a polar polymer film than a non-polar polymer film.

High barrier metallized BOPP such as Toray Plastics (America), Inc.'s PWX3 product typically demonstrates oxygen barrier of 15.5 cc/m²/day (23° C., 0% RH) and moisture barrier of 0.155 g/m²/day (38° C., 90% RH). Another manufacturer of barrier PLA film, Alcan Packaging Inc., produces a silicon oxide coated PLA film under the tradename Ceramis® whose typical data sheet shows an oxygen barrier of 7.75 cc/m²/day (23° C., 50% RH) and moisture barrier of 7.75 g/m²/day (38° C., 90% RH). Biofilm S. A. promotional literature (such as presented at the "Innovation Takes Root" conference hosted by NatureWorks LLC at Las Vegas, Nev. Sep. 16-18,2008) discusses transparent barrier PLA films demonstrating 3-10 g/m²/day (38° C./90% RH) using various vacuum chamber deposition processes. Vacuum deposition of metal on top of these transparent barrier layers (e.g. silicon oxide, aluminum oxide, or other coatings) to improve moisture barrier properties is costly due to the multiple processing steps required.

U.S. patent application Ser. No. 10/400,056 publication number 2004/0191541 A1 describes a multi-layer metallized film comprising a polyolefin core layer (typically of polypropylene), a polyolefin-based tie-layer on one side of the core layer, and a metal receiving layer of PLA on the tie-layer opposite the core layer side. The PLA layer is metallized. Gas barrier property of this metallized film is very good, with the examples citing moisture barrier as 0.054-0.093 g/m²/day (38° C., 90% RH) and oxygen barrier as 1.09-1.24 cc/m²/day (23° C., 0% RH). However, such a film formulation is primarily based on petrochemicals (such as polypropylene or copolymers thereof), being 96-98 wt % of the total film structure. PLA bio-polymer is only 2-4 wt % of the film. Thus, such a film cannot claim to be a "sustainable" film, being made from a majority amount of petroleum-based resins versus bio-based resins, and also will not be biodegradable.

U.S. Pat. No. 7,128,969 describes a film composed of a base layer of PLA with a minority component of a thermoplastic or polyolefin such as polypropylene or polyethylene, typically less than 1% by weight of the base layer. Such a formulation is particularly suitable for thermoforming or biaxial stretching by means of pneumatic drawing or other mechanical forming. In addition, the use of polyolefin additives such as polypropylene or polyethylene will cause incompatibilities with the polylactic acid polymer resulting in a hazy film appearance. The invention does not contemplate such a structure or formulation for metallizing or for high barrier applications. Nor does it contemplate multi-layer film designs utilizing polyolefin-based metal receiving layers wherein the majority component of such a layer is polyolefin and not PLA.

EP Patent 01385899 describes a multi-layer film design using a PLA base layer formulated with a cyclic polyolefin copolymer (COC) as a cavitating agent to produce an opaque biaxially oriented PLA film. This patent does not contemplate metallization of such a film with superior gas and moisture barrier properties, nor such a film with a polyolefin, non-PLA metal receiving layer.

EP Patent 01385700 describes a biaxially oriented PLA film with good antistatic properties by incorporating antistatic additives such as glycerol monostearate (GMS) into the base layer of PLA. However, the invention does not contemplate such a structure or formulation for metallizing or for high barrier applications. Nor does it contemplate multi-layer film designs utilizing polyolefin-based metal receiving layers wherein the majority component of such a layer is polyolefin and not PLA.

U.S. Pat. No. 7,354,973 describes a polylactic acid composition of 60-97 wt % of PLA and about 3-40 wt % of an ethylene copolymer impact modifier of 20-95 wt % ethylene, 3-70 wt % of an olefin of the formula $CH_2=C(R^1)CO_2R^2$ where $R^1$ is hydrogen or an alkyl group with 1-8 carbon atoms and $R^2$ is an alkyl group with 1-8 carbon atoms, and 0.5-25 wt % of an olefin of the formula $CH_2=C(R^3)CO_2R^4$ where $R^3$ is hydrogen or an alkyl group with 1-6 carbon atoms and $R^4$ is glycidyl. This composition has been found to be suitable as a toughened composition for injection molding applications to prevent brittleness. However, the invention does not contemplate such a structure or formulation for metallizing or for high barrier applications. Nor does it contemplate multi-layer film designs utilizing polyolefin-based metal receiving layers wherein the majority component of such a layer is polyolefin and not PLA.

U.S. Pat. No. 7,368,160 describes biaxially oriented multilayer coextruded polylactic acid films with a PLA skin layer containing 0.05-0.6% of crosslinked polymer antiblock particles. However, the invention does not contemplate such a structure or formulation for metallizing or for high barrier applications. Nor does it contemplate multi-layer film designs utilizing polyolefin-based metal receiving layers wherein the majority component of such a layer is polyolefin and not PLA.

The inventors seek to address the above issues of making high gas and moisture barrier metallized BOPLA films.

BRIEF SUMMARY OF THE INVENTION

Described are multi-layer biaxially oriented polylactic acid (BOPLA) films that include novel formulations which exhibit improved barrier properties, particularly for moisture vapor transmission barrier, after metallizing. This high barrier formulation combines a polyolefin-based metal receiving layer with a PLA core layer to improve metallized moisture and oxygen barrier as well as maintain degradability under certain environmental and aging conditions.

One embodiment is a method for improving and achieving high moisture barrier properties with metallized oriented PLA films while maintaining a high percentage of sustainable, bio-based resin content, and maintaining degradable properties, as well as maintaining a reasonable economical process. The inventors have found a solution whereby a multi-layer film design incorporates a polylactic acid polymer base layer, use of a polyolefin-based tie-resin with polar functionalities, and a polyolefin-based metal receiving layer which, when metallized, provides improved moisture barrier properties, maintains a majority composition of bio-polymer in the total film construction and is degradable under biodegradation or composting environmental conditions. Preferably, the total film construction includes at least 50 wt %, at least 75 wt %, or at least 90 wt % or more bio-polymer, for example, PLA.

Another embodiment is a multi-layer laminate film a first layer including a crystalline PLA resin-containing blend and a second skin layer including a substantially polyolefin resin-containing blend on one side of the crystalline PLA layer. The first crystalline PLA resin-containing blend layer may be considered a core or base layer to provide the bulk strength of the laminate film. The first PLA core layer may be a blend of crystalline PLA homopolymer and can be combined with an amount of tie-layer or compatibilizing resin which is polyolefin-based and has polar functional groups.

The first PLA-based resin core layer may also include other optional ingredients such as an amount of ethylene-acrylate copolymer that can act as a processing aid to enable high transverse orientation rates of up to 8-11×. Without such a processing aid, transverse orientation rates would be on the order of 3-5×. The first PLA core layer may also include an optional amount of amorphous PLA blended with the crystalline PLA as well as an optional ethylene-methacrylate copolymer. The first PLA-based resin core layer may also include various additives such as antiblock particles to allow for easier film handling.

The second skin layer may primarily include a polyolefin such as polypropylene or a copolymer of propylene, or blends thereof. This skin polyolefin-based skin layer may also include an amount of tie-layer or compatibilizing resin. This tie-layer or compatibilizing resin may be polyolefin-based and have polar functional groups. This provides for adequate bonding of this skin layer to the PLA core layer. In addition, the second polyolefin-based resin skin layer may also include various additives such as antiblock particles to allow for easier film handling.

Furthermore, as another embodiment, the laminate may further include a third skin layer that primarily includes a PLA-containing resin. This third skin layer may be located on the first PLA resin-containing core layer opposite the side with the polyolefin skin layer for use as a laminating layer or heat sealable layer. As a laminating layer, this third layer of this laminate may include either an amorphous PLA or a crystalline PLA, or blends thereof, and can be discharge-treated and contain various additives such as antiblock particles to allow for easier film handling. As a heat sealable layer, it is preferred to use an amorphous PLA resin which provides heat sealable properties. Again, this layer may contain various additives such as antiblock particles to allow for easier film handling.

Preferably, the first PLA resin-containing core layer includes a crystalline polylactic acid homopolymer of about 90-100 wt % L-lactic acid units (or 0-10 wt % D-lactic acid units). Preferably, this layer includes at least 40 wt %, at least 50 wt %, at least 70 wt %, or at least 90 wt % PLA, preferably the PLA is crystalline PLA. The tie-layer resin can include a maleic anhydride grafted or maleic anhydride copolymerized polyolefin resin in an amount of 0-20 wt % of the core layer. Other polar functionalized tie-resins may also be utilized. An optional amount of amorphous PLA may also be blended in with the crystalline PLA from 0-48 wt % of the core layer. The amorphous PLA is also based on L-lactic acid units but has greater than 10 wt % D-lactic acid units and/or meso-lactide units (which includes one each of L and D lactic acid residuals). An optional amount of the ethylene-acrylate copolymer component of the core layer formulation is from about 2-10 wt % of the core layer. If no third layer is coextruded with the core layer, it is also contemplated to add to the core layer antiblock particles of suitable size, for example, amorphous silicas, aluminosilicates, sodium calcium aluminum silicates, crosslinked silicone polymers, and polymethylmethacrylates to aid in machinability and winding. Suitable amounts range from 0.03-0.5% by weight of the core layer with typical particle sizes of 3.0-6.0 µm in diameter.

Preferably, the second polyolefin-based skin layer includes a propylene homopolymer, propylene copolymer (e.g. ethylene-propylene, propylene-butene, ethylene-propylene-butene), ethylene homopolymer (preferably high density polyethylene), or blends thereof. Preferably, this layer includes at least 50 wt %, at least 70 wt % or at least 97 wt % polyolefin. The second polyolefin skin layer also includes an amount of tie-resin or compatibilizing resin which contains a polar functional group. Preferably, this can be a maleic anhydride-grafted propylene or ethylene-based polymer and can be used in an amount of 2-30 wt % of the second skin layer. This second polyolefin-based skin layer may be discharge-treated on its exposed surface so as to make it suitable for other purposes such as printing, laminating, coating, or metallizing, with the latter preferred.

Antiblock particles of suitable size, for example, amorphous silicas, aluminosilicates, sodium calcium aluminum silicates, crosslinked silicone polymers, and polymethylmethacrylates may be added to the second skin layer to aid in machinability and winding. Suitable amounts range from 0.03-0.5% by weight of the core layer with typical particle sizes of 3.0-6.0 µm in diameter.

Preferably, if a third skin layer is employed, the third skin layer is a heat sealable PLA resin-containing layer comprising an amorphous PLA of greater than 10 wt % D-lactic acid units. The impact modifier/process aid ethylene-acrylate copolymer may not be included in this layer, as the amorphous PLA may be oriented relatively easily. This first heat sealable amorphous PLA resin-containing layer can also include an antiblock component, for example, amorphous silicas, aluminosilicates, sodium calcium aluminum silicates, crosslinked silicone polymers, and polymethylmethacrylates to aid in machinability and winding and to lower coefficient of friction (COF) properties. Suitable amounts range from 0.03-0.5% by weight of the core layer with typical particle sizes of 3.0-6.0 µm in diameter, depending on the final thickness of this layer. Migratory slip additives may also be utilized to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer.

In another embodiment the third PLA resin-containing layer may include a non-heat-sealable amorphous PLA such as a crystalline PLA resin similar to that used in the second PLA resin-containing core layer. In addition, various blends of amorphous and crystalline PLA may be utilized at similar ratios as described for the core layer. In the case that a crystalline PLA is used or a blend comprising crystalline PLA, an amount of the ethylene-acrylate copolymer process aid may be used, again in the amount of 2-10 wt % of this layer to enable transverse orientation at high rates.

Preferably, this layer also contains antiblock particles selected from the group consisting of amorphous silicas, aluminosilicates, sodium calcium aluminum silicates, crosslinked silicone polymers, and polymethylmethacrylates to aid in machinability and winding. Suitable amounts range from 0.03-0.5% by weight of the core layer and typical particle sizes of 3.0-6.0 µm in diameter, depending on the final thickness of this layer. Migratory slip additives may also be utilized to control COF properties such as fatty amides (e.g. erucamide, stearamide, oleamide, etc.) or silicone oils ranging from low molecular weight oils to ultra high molecular weight gels, or blends of fatty amides and silicone oil-based materials. Suitable amounts of slip additives to use can range from 300 ppm to 10,000 ppm of the layer. Preferably, this non-heat sealable embodiment using an optional third PLA resin-containing layer is a discharge-treated layer having a surface for lamination, metallizing, printing, or coating with adhesives or inks.

In the case where the above embodiments are to be used as a substrate for vacuum deposition metallizing, it is recommended that migratory slip additives not be used as these types of materials may adversely affect the metal adhesion or metallized gas barrier properties of the metallized BOPLA film. It is thought that as the hot metal vapor condenses on the film substrate, such fatty amides or silicone oils on the surface of the film may vaporize and cause pin-holing of the metal-deposited layer, thus compromising gas barrier properties. Thus, only non-migratory antiblock materials should be used to control COF and web-handling.

A further embodiment is to use a discrete tie-resin layer interposed between the first PLA core layer and the second polyolefin skin layer. Such a discrete tie-resin layer can be advantageous by eliminating the need to blend tie-resins into the polyolefin skin second layer and/or the main PLA core layer for bonding. In this embodiment, the discrete tie-resin interlayer includes the tie or compatibilizing resin and preferably is a maleic anhydride grafted or copolymerized propylene or ethylene-based polymer. Another embodiment may utilize a discrete tie-resin layer and also include blends of tie-resin in either or both the PLA core first layer and polyolefin skin second layer.

For these multi-layer film structures described above, it is preferable to discharge-treat the side of this multi-layer film structure with the second polyolefin skin layer for lamination, metallizing, printing, or coating, but preferably for metallizing. Discharge-treatment in the above embodiments can be accomplished in several manners, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments may further include a vacuum-deposited metal layer on the discharge-treated layer's surface. Preferably, the metal layer has a thickness of about 5 to 100 nm, has an optical density of about 1.5 to 5.0, and includes aluminum, although other metals can be utilized such as titanium, vanadium, chromium, manganese, iron, cobalt, nickel, copper, zinc, gold, or palladium, or alloys or blends thereof.

Preferably, the laminate film is produced via coextrusion of the polyolefin layer and the blended core layer and other layers if desired, through a compositing die whereupon the molten multilayer film structure is quenched upon a chilled casting roll system or casting roll and water bath system and subsequently oriented in the machine and/or transverse direction into an oriented multi-layer film. Machine direction orientation rate is typically 2.0-3.0× and transverse direction orientation is typically 3.0-5.0×. With the use of the ethylene-acrylate impact modifier process aid in the core layer, transverse direction orientation may be increased to 8.0-11.0×. Heat setting conditions in the TDO oven are also utilized to minimize thermal shrinkage effects.

All these examples can also be metallized via vapor-deposition, preferably a vapor-deposited aluminum layer, with an optical density of at least about 1.5, preferably with an optical density of about 2.0 to 4.0, and even more preferably between 2.3 and 3.2.

Embodiments described herein include "hybrid" film structures of substantially PLA-based films with a polyolefin-based metal-receiving skin layer to allow improved moisture barrier characteristics after metallizing. The invention can maintain a significant amount of sustainable bio-based polymer for an overall film content of ca. 90 wt % PLA and also can maintain degradable properties under certain weathering and environmental conditions.

Additional advantages of this invention will become readily apparent to those skilled in the art from the following detailed description, wherein only some embodiments are shown and described. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

Figure 1:
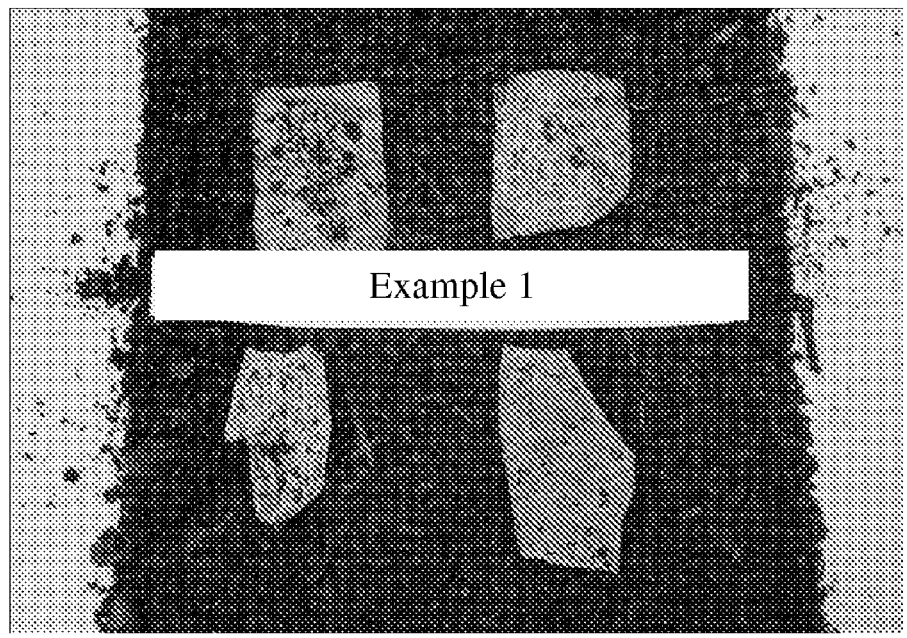
FIG. 1 is a picture showing the film of Example 1 after 65 days aging under disintegration test conditions of D-6400 (sub-group D-5338).
Figure 2:
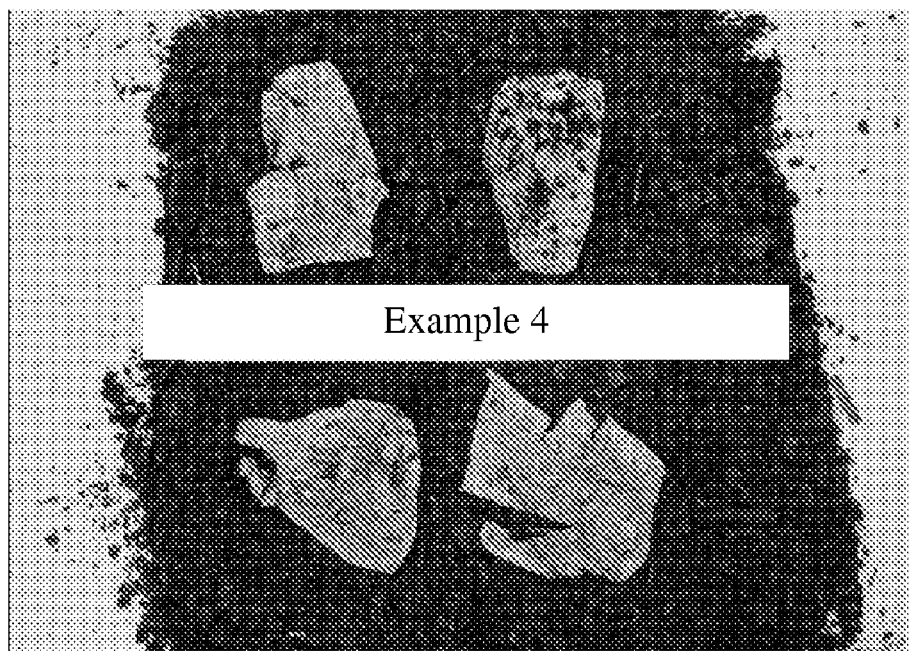
FIG. 2 is a picture showing the film of Example 4 after 65 days aging under disintegration test conditions of D-6400 (sub-group D-5338).
Figure 3:
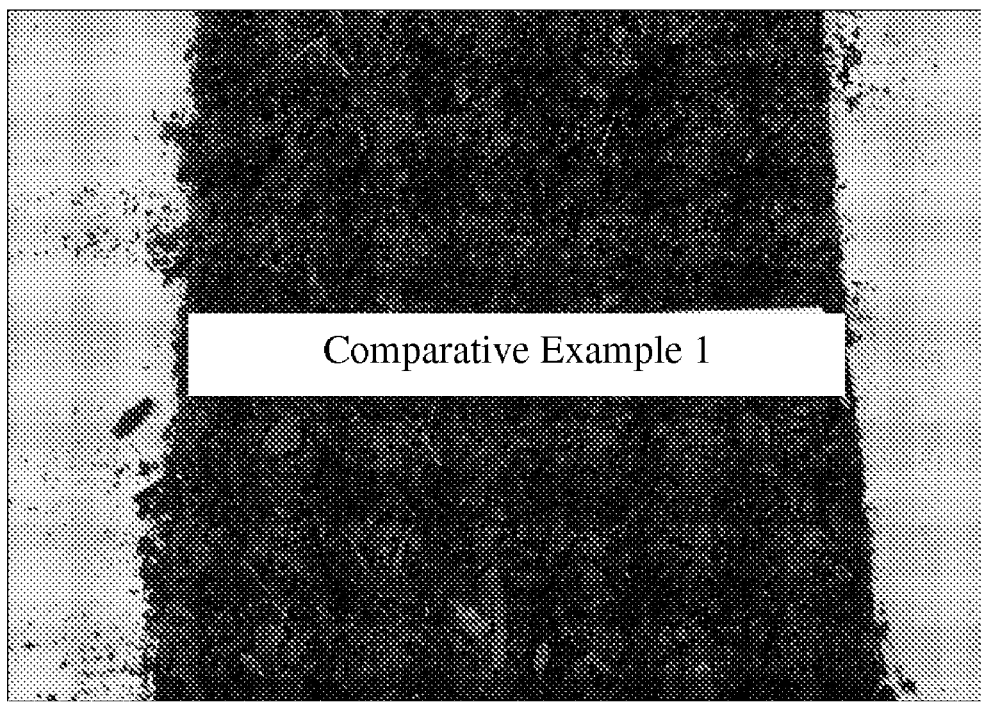
FIG. 3 is a picture showing the film of Comparative Example 1 after 65 days aging under disintegration test conditions of D-6400 (sub-group D-5338).
Figure 4:
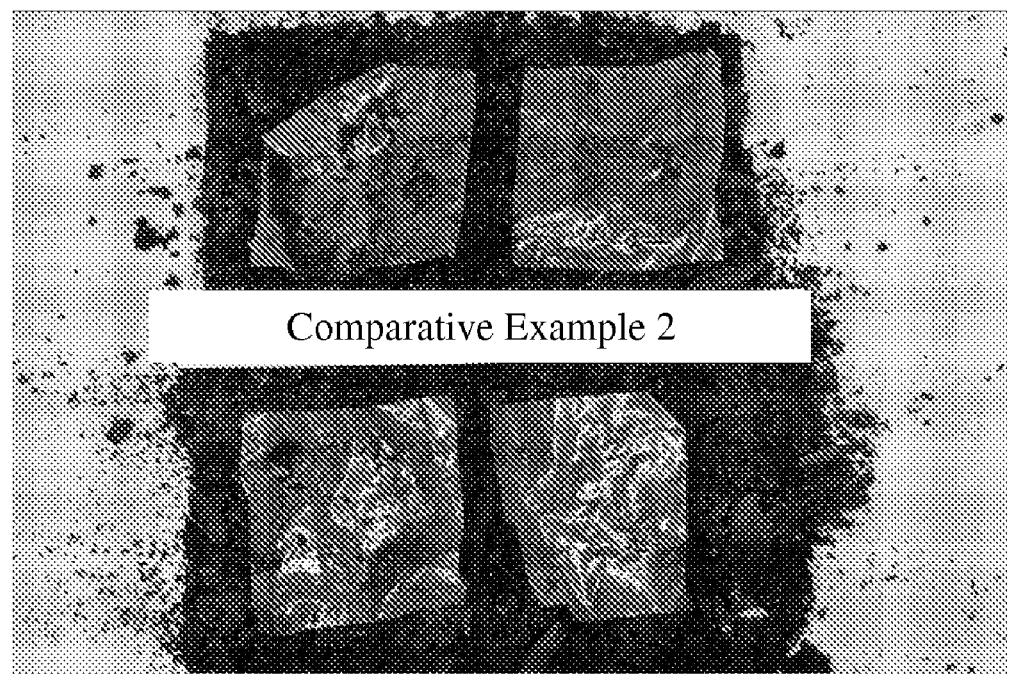
FIG. 4 is a picture showing the film of Comparative Example 2 after 65 days aging under disintegration test conditions of D-6400 (sub-group D-5338).

The described embodiments provide the attributes of using bio-based polymers, which may be from renewable and sustainable resources, and polyolefin materials for improved metallizing and barrier properties. The solutions involve using a PLA base layer coextruded with a polyolefin skin layer which is modified to become more polar or blended with a polar-modified polyolefin. Another embodiment includes coextruding a PLA base layer, a discrete polar-modified polyolefin tie layer and a polyolefin metal receiving layer. Such structures, when metallized, have shown a significant improvement in gas barrier properties, particularly for moisture barrier, and maintain suitable degradable properties.

For useful protection of snack food products from staleness and/or rancidity, and to ensure a reasonably adequate shelf-life, it is preferable that these films have a moisture barrier property of at least about 1.0 g/m²/day or better, and more preferably, to have a moisture barrier property of about 0.50 g/m²/day or better, at 38° C. and 90% relative humidity (RH). It is preferable to have an oxygen barrier of at least about 46.5 cc/m²/day, and more preferably 31 cc/m²/day or better, at 23° C. and 0% RH.

In one embodiment, the laminate film includes a 2-layer coextruded film of: 1) A mixed PLA resin core layer comprising a crystalline polylactic acid polymer and blended with a minority amount of a polar tie-layer resin (the core layer blend can also be optionally blended with an amount of an amorphous PLA polymer, and an optional amount of ethylene-acrylate copolymer to help enable high transverse orientation); and 2) A polyolefin metal receiving layer including a propylene homopolymer, propylene copolymer, high density polyethylene, or blends thereof, further blended with a minority amount of a polar tie-layer resin. The side of the polyolefin metal receiving layer blend opposite the PLA core resin layer may be discharge-treated.

Another embodiment of the laminate film includes a similar construction as above, except that a third PLA skin layer may be disposed on the side of the crystalline PLA core layer blend opposite the polyolefin blend metal receiving layer. This third PLA layer can include either crystalline PLA resin or amorphous PLA resin or blends thereof. In the case where crystalline PLA resin is part of this layer's formulation, an amount of ethylene-acrylate copolymer can optionally be incorporated as in the core layer formulation to help enable high transverse orientation. Generally, it is preferable to use an amorphous PLA to impart heat sealable characteristics to this film design. If using this layer as a non-heat sealable layer, it is usually desirable to discharge-treat the exposed surface of this third layer in order to provide further functionality as a surface to receive metallization, printing, coating, or laminating adhesives.

A further embodiment of the film can include interposing a discrete polar tie-resin layer between the PLA blend core layer and the polyolefin blend metal receiving layer. In this way, it is possible to forgo the addition of polar tie-resin in either of the core or metal receiving layer. To ensure good bonding between the PLA core layer and the interposed tie-resin layer, some of the tie-resin can be added to the PLA core layer. Similarly, if it is desired to ensure good bonding between the interposed tie-resin layer and the polyolefin metal receiving layer, some of the tie-resin can be added to the polyolefin layer. Preferably, this layer includes at least 40 wt %, at least 50 wt %, at least 70 wt %, or at least 90 wt % polar-modified polyolefin.

The polylactic acid resin core layer may be a crystalline polylactic acid of a specific optical isomer content and can be biaxially oriented. As described in U.S. Pat. No. 6,005,068, lactic acid has two optical isomers: L-lactic acid (also known as (S)-lactic acid) and D-lactic acid (also known as (R)-lactic acid). Three forms of lactide can be derived from these lactic acid isomers: L,L-lactide (also known as L-lactide) and which includes two L-lactic acid residuals; D,D-lactide (also known as D-lactide) and which includes two D-lactic acid residuals; and meso-lactide which includes one each of L and D-lactic acid residuals. The degree of crystallinity is determined by relatively long sequences of a particular residual, either long sequences of L or of D-lactic acid. The length of interrupting sequences is important for establishing the degree of crystallinity (or amorphous) and other polymer features such as crystallization rate, melting point, or melt processability.

The crystalline polylactic acid resin is preferably one including primarily of the L-lactide isomer with minority amounts of either D-lactide or meso-lactide or combinations of D-lactide and meso-lactide. Preferably, the minority amount is D-lactide and the amount of D-lactide is 10 wt % or less of the crystalline PLA polymer. More preferably, the amount of D-lactide is less than about 5 wt %, and even more preferably, less than about 2 wt %. Suitable examples of crystalline PLA include Natureworks® Ingeo™ 4042D and 4032D. These resins have relative viscosity of about 3.9-4.1, a melting point of about 165-173° C., a crystallization temperature of about 100-120° C., a glass transition temperature of about 55-62° C., a D-lactide content of about 4.25 wt % and 1.40 wt % respectively, density of about 1.25 g/cm³, and a maximum residual lactide in the polylactide polymer of about 0.30% as determined by gas chromatography. Molecular weight $M_w$ is typically about 200,000; $M_n$ typically about 100,000; polydispersity about 2.0. Natureworks® 4032D is the more preferred crystalline PLA resin, being more crystalline than 4042D and more suitable for high heat biaxial orientation conditions. In addition, the 4042D PLA grade contains about 1000 ppm of erucamide and for some applications, particularly for gas barrier metallizing, may not be suitable.

The core resin layer can be of any thickness after biaxial orientation, but is typically 8 µm to 100 µm in thickness, preferably between 10 µm and 50 µm, and more preferably between about 15 µm and 25 µm in thickness. A preferred embodiment is to use the higher crystalline, higher L-lactide content PLA (lower wt % D-lactide of about 1.40) such as Natureworks® 4032D.

The core layer may also include an amount of amorphous PLA resin to improve further extrusion processing and oriented film processing. The addition of amorphous PLA in the core layer helps to lower extrusion polymer pressure and in terms of film manufacturing, helps to reduce or slow crystallization rate of the newly oriented film. This aids in the orientation of the PLA film in both MD and TD and helps reduce defects such as uneven stretch marks. It also helps with the slitting of the biaxially oriented film at the edge-trimming section of the line by reducing the brittleness of the edge trim and reducing the instances of edge trim breaks which can be an obstacle to good productivity.

The amorphous PLA is preferably based on an L-lactide isomer with D-lactide content of greater than 10 wt %. A suitable amorphous PLA to use is Natureworks® Ingeo™ 4060D grade. This resin has a relative viscosity of about 3.25-3.75, $T_g$ of about 52-58° C., seal initiation temperature of about 80° C., density of about 1.24 g/cm$^3$, a D-lactide content of about 12 wt %, and a maximum residual lactide in the polylactide polymer of about 0.30% as determined by gas chromatography. The molecular weight $M_w$ is about 180,000. Suitable amounts of amorphous PLA to use in the core are concentrations of up to about 48 wt % of the core layer, preferably up to about 30 wt % of the core layer, and even more preferably about 15 wt % of the core layer. It should be noted, however, that too much amorphous PLA in the core layer (e.g. 50% or greater) can cause high thermal shrinkage rates after biaxial orientation and in spite of heat-setting conditions in the transverse orientation oven to make a thermally stable film. A thermally, dimensionally stable is desired if the substrate is to be used as a metallizing, printing, coating, or laminating substrate. (However, if the BOPLA is desired as a shrinkable film, this composition and appropriate processing conditions might be suitable.)

Another optional component that can be blended into the crystalline PLA core layer is a minority amount of ethylene-acrylate copolymer to enable high transverse orientation rates similar to that used in BOPP orientation, if desired. It may be desirable to do this as the higher orientation rate may be beneficial for profile control and surface smoothness of the polyolefin metal receiving layer, particularly if a propylene homopolymer or copolymer is chosen. Ethylene-acrylates are of the general chemical formula of $CH_2=C(R^1)CO_2R^2$ where $R^1$ can be hydrogen or an alkyl group of 1-8 carbon atoms and $R^2$ is an alkyl group of 1-8 carbon atoms.

Ethylene-acrylate copolymers that may be utilized can be based on ethylene-acrylate, ethylene-methacrylate, ethylene-n-butyl acrylate-glycidyl methacrylate, ethylene-glycidyl methacrylate, ethylene-butyl-acrylate, ethylene acrylic esters, or blends thereof. Ethylene vinyl acetate (EVA) and ethylene methacrylate (EMA) can also be utilized. Other similar materials may also be utilized. As described in U.S. Pat. No. 7,354,973, suitable compositions of the ethylene-acrylate copolymers can be about 20-95 wt % ethylene content copolymerized with about 3-70 wt % n-butyl acrylate and about 0.5-25 wt % glycidyl methacrylate monomers. A particularly suitable ethylene-acrylate copolymer of this type is one produced by E. I. DuPont de Nemours and Company Packaging and Industrial Polymers Biomax® Strong 120. This additive has a density of about 0.94 g/cm$^3$, a melt flow rate of about 12 g/10 minutes at 190° C./2.16 kg weight, a melting point of about 72° C., and a glass transition temperature of about –55° C. Other suitable ethylene-acrylate copolymer impact modifiers commercially available are: Dupont Elvaloy® PTW, Rohm & Haas, Inc. BPM500, and Arkema, Inc. Biostrength® 130.

Suitable amounts of ethylene-acrylate copolymer to be blended in the crystalline PLA-comprising core layer may include from 2-10 wt % of the core layer, preferably 2-7 wt % and more preferably, 3-5 wt %. At these concentrations, acceptable clarity of the biaxially oriented film is maintained. Too much ethylene-acrylate may cause haziness; too little may not enable transverse orientation at 8-10×. Blending into the core layer can be done most economically by dry-blending the respective resin pellets; it is contemplated that more aggressive blending such as melt-compounding via single-screw or twin-screw can result in better dispersion of the ethylene-acrylate copolymer throughout the PLA matrix.

Either the core layer or the polyolefin skin layer, or both, may be blended with a minority amount of a polar functionalized tie-resin. Maleic anhydride-grafted polymers may be utilized and include, but are not limited to, those such as maleic anhydride-grafted propylene homopolymers and copolymers (e.g. ethylene-propylene, propylene-butene, ethylene-propene-butene), maleic anhydride-grafted polyethylenes (especially high density polyethylene), and maleic anhydride-grafted vinyl acetates or ethylene vinyl acetates. In addition, maleic anhydride copolymers can be used, including but not limited to those such as ethylene-butyl acrylate-maleic anhydride copolymers. Preferably, maleic anhydride-grafted propylene homopolymers or copolymers are employed due to convenience and supply.

These same maleic anhydride-grafted resins and maleic anhydride copolymers described above can also be used in those embodiments where a discrete tie-resin layer is interposed between the core PLA blend layer and the polyolefin blend metal receiving layer.

Suitable maleic anhydride-grafted polymers include those produced by: E.I. DuPont de Nemours and Company Fusabond® series such as grade 353D maleic anhydride-grafted ethylene-propylene random copolymer of melt flow rate about 22.4 g/10 minutes at 160° C./325 g, melting point of about 136° C., and density of about 0.94 g/cm$^3$; Mitsui Chemical Company's Admer® series maleic anhydride-grafted polypropylene such as grade QF500A of melt flow rate of about 3.0 g/10 min at 230° C., 143° C. Vicat softening point, and 0.12-0.15 wt % maleic anhydride content; DuPont Bynel® series such as grade 3860 or 38E536 maleic anhydride-grafted vinyl acetates of, respectively, 5.7 and 3.5 melt index at 190° C., 0.96 and 0.95 g/cm$^3$ density, melting point of about 74 and 75° C., and Vicat softening point of about 48 and 49° C.; Arkema Orevac® series maleic anhydride-grafted ethylene vinyl acetates such as grade CA100 of 200 melt index at 190° C., melting point of about 161° C., Vicat softening point of about 146° C., and maleic anhydride content of about 1.0 wt %; Arkema Orevac® series maleic anhydride-grafted polyethylenes such as grade 18390 of melt flow index 5.0 g/10 min at 190° C., density 0.885 g/cm$^3$, melting temperature of about 75° C., and Vicat softening point of about 52° C.

Suitable maleic anhydride copolymers include those produced by Arkema under the Lotader® tradename. These polar tie-resins are ethylene polar terpolymers and the chemistry and composition are different from anhydride-grafted polyolefins. The ethylene polar terpolymers are made through polymerization with 3 co-monomers (i.e. ethylene, butyl or methyl acrylate, and maleic anhydride or glycidil methacrylate) and the polar functional groups are incorporated as part of the polymer chain's backbone. In contrast, the anhydride-grafted polyolefins are made by grafting the functional anhydride groups onto the side chains of a polymer via radical reactions.

The degree in which anhydride groups can be grafted onto polypropylene or ethylene-propylene copolymers is limited because this radical reaction used in the grafting process results in a competing reaction: chain scission of the polypropylene backbone at the tertiary carbons. Normally, high molecular weight anydride-grafted polypropylene or ethylene-propylene copolymer contains less than 1% of the anydride groups for this reason. According to the resin producer Arkema (and formerly AtoFina) from references presented at TAPPI Conference May 2003 "Adhesive Properties of Ethylene-Acrylic Ester-Maleic Anhydride Terpolymers in Extrusion Coating/Lamination" and product literature presentation materials May 2005 "Lotader: Ultra Versatile Adhesives for Extrusion Coating and Extrusion Lamination Technologies", the low co-monomer content (e.g. 10% or less butyl acrylate or methyl acrylate co-monomer) versions of these ethylene polar terpolymers have shown poor effectiveness as a tie-layer for polypropylene and polar resins and thus, have not been used in oriented polypropylene film applications.

High co-monomer content (e.g. 16-25% butyl acrylate or methyl acrylate co-monomer) ethylene polar terpolymers are effective for bonding to polypropylene substrates. Such high co-monomer content ethylene polar terpolymers have a melting point lower than the low content co-monomer versions (77-90° C. vs. 105-107° C. respectively), the material is much softer (modulus 20-60 MPa vs. 110-120 MPa respectively) and stickier (Vicat softening point 40-55° C. vs. 65-80° C. respectively). Lotader® grades such as 4210 of 3.1 wt % maleic anhydride content, 9.0 melt flow rate at 190° C., melting point 102° C., density 0.94 g/cm$^3$; other grades such as 4403, 4503, and 4603 can also be considered which have varying amounts of maleic anhydride content and melting points. Suitable amounts of tie-resin to be incorporated into either the metal receiving layer or the core layer, or both layers, is 5-30 wt % of the respective layer, preferably 10-20 wt %.

Preferred polar tie-resins are the maleic anhydride-grafted vinyl acetates such as the DuPont Bynel® grade 3860. A preferred embodiment is to use this grade as a discrete tie-resin layer interposed between the PLA blend core layer and the polyolefin metal receiving layer. The amount of 3860 to be used as a tie-resin layer is about 100 wt % of the tie-resin layer. If this preferred embodiment is employed, the thickness of this tie-resin layer after biaxial orientation may 0.5-3.0 µm thick, preferably 0.75-1.0 µm thick.

The polyolefin metal receiving layer may include propylene homopolymer, "mini-random" propylene homopolymer (i.e. a specific class of ethylene-propylene copolymers whereby the ethylene content of the polymer is less than 1.0 wt %, typically about 0.3-0.8 wt %), ethylene-propylene copolymers, butene-propylene copolymers, ethylene-propylene-butene copolymers, ethylene homopolymers (particularly high density and medium density polyethylene), or blends thereof, the preferred being a mini-random propylene homopolymer of about 0.6 wt % ethylene content of the polymer. In the embodiment where no discrete tie-resin layer is used to bond this polyolefin-based metal receiving layer to the PLA-based core layer, the tie-resin (as described previously) is preferably added to the polyolefin-based metal receiving layer in an amount of 5-30 wt % of the layer.

It is often desirable to add an amount of antiblocking agent to the metal receiving layer for aiding machinability and winding. An amount of an inorganic antiblock agent can be added in the amount of 100-1000 ppm of the polyolefin-based resin layer, preferably 300-600 ppm. Preferred types of antiblock are spherical sodium aluminum calcium silicates or an amorphous silica of nominal 6 µm average particle diameter, but other suitable spherical inorganic antiblocks can be used including crosslinked silicone polymer or polymethylmethacrylate, and ranging in size from 2 µm to 6 µm. Preferred is a nominal 3 µm spherical sodium aluminum calcium silicate manufactured by Mizusawa Chemicals under the tradename Silton® JC-30.

In some embodiments, the metal receiving polyolefin-based resin layer may be surface treated on the side opposite the core layer with an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide is particularly preferred. This method results in a treated surface that includes nitrogen-bearing functional groups, preferably at least 0.3 atomic % or more, and more preferably, at least 0.5 atomic % or more. This treated surface layer is then well suited for subsequent purposes of metallizing, printing, coating, or laminating, preferably metallizing.

Some embodiments may include an additional skin layer on the side of the core layer opposite the metal receiving layer, this additional coextruded skin layer may be a heat sealable resin layer including an amorphous polylactic acid polymer. The heat sealable resin layer can be coextruded on one side of the core layer opposite the metal receiving layer, the heat sealable layer may have a thickness after biaxial orientation of between 0.5 and 5 µm, preferably between 1.0 and 2.0 µm.

As previously described, the amorphous PLA is preferably based on a L-lactide isomer with D-lactide content of greater than 10 wt %. A suitable amorphous PLA to use may be Natureworks® Ingeo™ 4060D grade. This resin has a relative viscosity of about 3.25-3.75, $T_g$ of about 52-58° C., seal initiation temperature of about 80° C., density of about 1.24 g/cm$^3$, a D-lactide content of about 12 wt %, and a maximum residual lactide in the polylactide polymer of about 0.30% as determined by gas chromatography. The molecular weight M, is about 180,000. The preferred amount to be used as a heat sealable skin layer is about 100 wt % of the layer. It is also preferred to add an amount of inorganic antiblock to this layer to aid in web-handling, COF control, film winding, and static control, among other properties. Suitable amounts may include 1000-5000 ppm of the heat sealable resin layer, preferably 3000-5000 ppm.

Preferred types of antiblock are spherical crosslinked silicone polymers such as Toshiba Silicone's Tospearl® grades of polymethlysilsesquioxane of nominal 2.0 and 3.0 µm sizes. Alternatively, sodium aluminum calcium silicates of nominal 3 µm in diameter can also be used (such as Mizusawa Silton® JC-30), but other suitable spherical inorganic antiblocks can be used including polymethylmethacrylate, silicas, and silicates, and ranging in size from 2 µm to 6 µm. Migratory slip agents such as fatty amides or silicone oils can also be added to the heat seal resin layer of types and quantities mentioned previously if lower COF is desired. However, if the films are to be used for metallizing, the use of migratory slip additives may be avoided in order to maintain metallized barrier properties and metal adhesion.

The coextrusion process includes a multi-layered compositing die, such as a two-, three-, or four-layer die (or more). In the case of a 2-layer coextruded film, a two-layer compositing die can be used. One embodiment is to coextrude in only two layers with only the blended PLA core layer and the polyolefin-based metal receiving layer coextruded on one side of the core layer. Either one or both of these layers may incorporate the tie-resin component. In this case, the core layer side opposite the metal receiving layer can be further modified by adding inorganic antiblock particles into the core layer itself and can also be surface-treated via a discharge-treatment method if so desired.

In the case of a 3-layer coextruded film, a 3-layer compositing die can be used whereby the PLA polymer blend core layer can be sandwiched between the heat sealable (or other functional purpose) PLA resin layer and the polyolefin-based metal receiving layer. For this case, the polar functionalized tie-resin may be incorporated into either the core layer or the metal receiving layer, or both layers.

In the case of a 4-layer coextruded film, a 4-layer compositing die may be used whereby the PLA-based core layer is coextruded upon one side of the amorphous PLA heat sealable layer or other functional coextruded PLA layer as desired; upon the opposite side of the core layer, a tie-resin layer may be coextruded; and upon the side of this tie-resin layer opposite the core layer side, the polyolefin-based metal receiving layer may be coextruded.

If the three-layer or four-layer coextruded film embodiment is chosen, the additional layer coextruded on the core layer opposite the metal receiving layer (or tie-resin and metal receiving layers) may be a heat sealable resin layer, having a thickness after biaxial orientation between 0.5 and 5 µm, preferably between 0.5 and 3 µm, and more preferably between 1.0 and 2.0 µm. A suitable material for this layer may be a crystalline PLA or amorphous PLA or blends thereof, as described earlier in the description. If amorphous PLA is used, the same suitable resin grade used for the heat sealable layer may be employed (e.g. Natureworks® 4060D). If crystalline PLA is used, the same suitable grades as used for the core layer may be employed such as Natureworks® 4042D or 4032D, with the 4032D grade preferred in general. Additionally, blends of both crystalline and amorphous PLA may be utilized for this layer, similar to previously described formulations for the core layer, but not limited to those descriptions. For example, the ratio of amorphous PLA to crystalline PLA for this third skin layer may range from 0-100 wt % amorphous PLA and 100-0 wt % crystalline PLA. In those embodiments in which crystalline PLA is used in the third layer, an optional amount of ethylene-acrylate copolymer can be used as described previously, in order to ensure the ability to transversely orient this layer at high orientation rates. A suitable amount of ethylene-acrylate copolymer to use in this skin layer may be 2-10 wt %, preferably 2-7 wt % and, more preferably, 3-5 wt %. The use of various blends of amorphous and crystalline PLA in this layer may make it more suitable for printing, metallizing, coating, or laminating, and the exact ratio of the blend can be optimized for these different applications.

This additional layer may also contain an anti-blocking agent and/or slip additives for good machinability and a low coefficient of friction. Suitable amounts include about 0.01-0.5% by weight of the third layer, preferably about 250-1000 ppm. Preferably, non-migratory inorganic slip and/or antiblock additives as described previously should be used to maintain gas barrier properties and metal adhesion if metallizing, or ink wetting and ink adhesion if printing.

In addition, another embodiment includes replacing the heat sealable amorphous PLA layer with a non-sealable PLA layer. In this variation, amorphous or crystalline PLA may be used, or blends thereof. In the case of making this layer non-sealable, preferably crystalline PLA should be used, either by itself or as the majority component of a blend with amorphous PLA. As discussed previously, if crystalline PLA is used for this layer, an optional amount of ethylene-acrylate copolymer can be used as part of this layer to aid high transverse orientation rates. Suitable amounts of ethylene-acrylate copolymer to use in this skin layer is 2-10 wt %, preferably 2-7 wt % and, more preferably, 3-5 wt %. Preferably, non-migratory inorganic slip and/or antiblock additives as described previously should be used to maintain gas barrier properties and metal adhesion if metallizing, or ink wetting and ink adhesion if printing. It is also preferred to add an amount of inorganic antiblock to this layer to aid in web-handling, COF control, film winding, and static control, among other properties. Suitable amounts would be about 1000-5000 ppm of the this non-eat sealable resin layer, preferably 3000-5000 ppm. Preferred types of antiblock are spherical crosslinked silicone polymer such as Toshiba Silicone's Tospearl® grades of polymethlysilsesquioxane of nominal 2.0 and 3.0 µm sizes. Alternatively, sodium aluminum calcium silicates of nominal 3 µm in diameter can also be used (such as Mizusawa Silton® JC-30), but other suitable spherical inorganic antiblocks can be used including polymethylmethacrylate, silicas, and silicates, and ranging in size from 2 µm to 6 µm. It is often preferred to discharge-treat the exposed side of this layer so as to enable adequate adhesion and wet-out of adhesives or inks or coatings to this side. In particular, cold seal latexes can be applied to this discharge-treat surface.

The multilayer coextruded films of the invention can be made either by sequential biaxial orientation or simultaneous biaxial orientation which are well-known processes in the art. On a 1.5 meter wide sequential orientation line, the multilayer coextruded laminate sheet may be coextruded at melt temperatures of about 190° C. to 215° C. as appropriate for the layer resin composition (i.e. whether the specific extruder is processing predominantly PLA or polyolefin resin blend) and cast and pinned—using electrostatic pinning—onto a cooling drum whose surface temperature may be controlled between 15° C. and 26° C. to solidify the non-oriented laminate sheet at a casting speed of about 6 mpm. The non-oriented laminate sheet may be stretched first in the longitudinal direction at about 40° C. to 65° C. at a stretching ratio of about 2 to about 4 times the original length, preferably about 3.0 times, using differentially heated and sped rollers and the resulting stretched sheet may be heat-set at about 40-45° C. on annealing rollers and cooled at about 25-40° C. on cooling rollers to obtain a uniaxially oriented laminate sheet. The uniaxially oriented laminate sheet may then introduced into a tenter at a linespeed of about 18-50 mpm and preliminarily heated between 65° C. and 75° C., and stretched in the transverse direction at a temperature of about 75-105° C. and at a stretching ratio of about 3 to about 8 times, preferably 3-5 times, the original length and then heat-set or annealed at about 115-145° C. to reduce internal stresses due to the orientation and minimize shrinkage and give a relatively thermally stable biaxially oriented sheet. TD orientation rates were adjusted by moving the transverse direction rails in or out per specified increments.

The biaxially oriented film has a total thickness between 10 and 100 µm, preferably between 15 and 30 µm, and most preferably between 20 and 25 µm. For simultaneous orientation, the machine direction and transverse direction stretching are done simultaneously using a specially designed tenterframe and clip and chain design which obviates the need for a machine direction orienter of driven and heated rollers.

One embodiment is to metallize the discharge-treated surface of the metal receiving layer opposite the core layer or, in the case of the embodiment in which a discrete tie-resin layer is used, opposite the tie-resin layer. The unmetallized laminate sheet may be first wound in a roll. The roll may then be placed in a vacuum metallizing chamber and the metal vapor-deposited on the discharge-treated metal receiving layer surface. The metal film may include titanium, vanadium, chromium, manganese, iron, cobalt, nickel, copper, zinc, aluminum, gold, or palladium, the preferred being aluminum. Metal oxides can also be utilized, the preferred being aluminum oxide. The metal layer shall have a thickness between 5 and 100 nm, preferably between 20 and 80 nm, more preferably between 30 and 60 nm; and an optical density between 1.5 and 5.0, preferably between 2.0 and 4.0, more preferably between 2.2 and 3.2. The metallized film may then be tested for oxygen and moisture gas permeability, optical density, metal adhesion, metal appearance and gloss, heat seal performance, tensile properties, thermal dimensional stability, and can be made into a laminate structure.

This invention will be better understood with reference to the following examples, which are intended to illustrate specific embodiments within the overall scope of the invention.

EXAMPLE 1

A 4-layer coextruded biaxially oriented PLA film was made using sequential orientation on a 1.5 meter wide tenter frame line, comprising a core layer (B) of Natureworks® 4032D crystalline PLA at about 70 wt % of the core layer and dry-blended with about 30 wt % of Natureworks® 4060D amorphous PLA. The coextruded metal receiving layer (A) including about 100 wt % of the layer of a propylene homopolymer Total Petrochemicals 3576X of nominal 9.0 melt flow rate at 230° C. The coextruded heat sealable skin layer (C) including substantially of Natureworks® 4060D at about 94 wt % of the skin layer. An antiblock masterbatch of 5 μm silica at a loading of 5 wt % of the masterbatch in a carrier resin of amorphous PLA (4060D) was added to the coextruded heat sealable skin layer at about 6 wt % of the skin layer for an effective antiblock loading of 3000 ppm. This antiblock masterbatch was provided by Clariant Oman® bl-698585. The tie-resin layer (D) including about 100 wt % of this layer of a maleic anhydride-grafted vinyl acetate DuPont Bynel® 3860.

The total thickness of this film substrate after biaxial orientation was ca. 70G or 0.7 mil or 17.5 μm. The thickness of the respective heat sealable resin layer (C) after biaxial orientation was ca. 6G (1.5 μm). The thickness of the core layer (B) after biaxial orientation was ca. 57G (14.25 μm). The thickness of the metal receiving layer (A) was ca. 4G (1.0 μm) after biaxial orientation. The thickness of the tie-resin layer (D) was ca. 3G (0.75 μm) after biaxial orientation.

The heat sealable layer (C) and the core layer (B) were melt processed at nominal 380° F. and 400° F. (193° C. and 204° C.), respectively. The metal receiving layer (A) and tie-resin layer (D) were melt processed at nominal 400° F. (204° C.). The 4-layer co-extrudate was passed through a flat die to be cast on a chill drum of 60° F. (15.5° C.) using an electrostatic pinner. The formed cast sheet was passed through a series of heated rolls at 110-145° F. (43-63° C.) with differential speeds to stretch in the machine direction (MD) at ca. 3.25× stretch ratio. This was followed by transverse direction (TD) stretching at ca. 4.0× stretch ratio in the tenter oven at 155-180° F. (68-82° C.) and heat-set or annealed to reduce film shrinkage effects at ca. 200° F. (93° C.). The resultant biaxially oriented film was subsequently discharge-treated on the metal receiving skin (A) layer's surface opposite the tie-resin layer (D) via corona treatment. The film was then wound up in roll form.

The 4-layer film roll was then metallized via vapor deposition processes well known in the art. The test rolls were placed inside a vacuum chamber metallizer for vapor deposition metallization using aluminum. The rolls were then metallized to a nominal optical density target of 2.4. The metallized rolls were then slit on a film slitter and tested for properties.

EXAMPLE 2

A process similar to Example 1 was repeated except that the metal receiving layer (A) including a blend of about 80 wt % of Total Petrochemical propylene homopolymer 3576X and about 20 wt % of Total Petrochemicals ethylene-propylene random copolymer 8573 of nominal 7/10 minutes at 230° C. and ca. 4.5 wt % ethylene content.

EXAMPLE 3

A process similar to Example 2 was repeated except that the tie-resin layer (D) was changed to Arkema Orevac® 18390 maleic anhydride-grafted polyethylene.

EXAMPLE 4

A 3-layer coextruded biaxially oriented PLA film was made using sequential orientation on a 1.5 meter wide tenter frame line, comprising a core layer (B) of Natureworks® 4032D crystalline PLA at about 70 wt % of the core layer and dry-blended with about 30 wt % of Natureworks® 4060D amorphous PLA. The coextruded metal receiving layer (A) including a blend of about 80 wt % of the layer of a propylene homopolymer Total Petrochemicals 3576X and 20 wt % of DuPont Fusabond® 353D maleic anhydride-grafted ethylene-propylene copolymer. The coextruded heat sealable skin layer (C) including substantially of Natureworks® 4060D at about 94 wt % of the skin layer. An antiblock masterbatch of 5 μm silica at a loading of 5 wt % of the masterbatch in a carrier resin of amorphous PLA (4060D) was added to the coextruded heat sealable skin layer at about 6 wt % of the skin layer for an effective antiblock loading of 3000 ppm. This antiblock masterbatch was provided by Clariant Oman® bl-698585.

The total thickness of this film substrate after biaxial orientation was ca. 70G or 0.7 mil or 17.5 μm The thickness of the respective heat sealable resin layer (C) after biaxial orientation was ca. 6G (1.5 μm). The thickness of the core layer (B) after biaxial orientation was ca. 60G (15 μm). The thickness of the metal receiving layer (A) was ca. 4G (1.0 μm) after biaxial orientation.

The heat sealable layer (C) and the core layer (B) were melt processed at nominal 380° F. and 400° F. (193° C. and 204° C.), respectively. The metal receiving layer (A) was melt processed at nominal 400° F. (204° C.). The 3-layer co-extrudate was passed through a flat die to be cast on a chill drum of 60° F. (15.5° C.) using an electrostatic pinner. The formed cast sheet was passed through a series of heated rolls at 110-145° F. (43-63° C.) with differential speeds to stretch in the machine direction (MD) at ca. 3.25× stretch ratio. This was followed by transverse direction (TD) stretching at ca. 4.0× stretch ratio in the tenter oven at 155-180° F. (68-82° C.) and heat-set or annealed to reduce film shrinkage effects at ca. 200° F. (93° C.). The resultant biaxially oriented film was subsequently discharge-treated on the metal receiving skin (A) layer's surface opposite the core layer (B) via corona treatment. The film was then wound up in roll form.

The 3-layer film roll was then metallized via vapor deposition processes well known in the art. The test rolls were placed inside a vacuum chamber metallizer for vapor deposition metallization using aluminum. The rolls were then metallized to a nominal optical density target of 2.4. The metallized rolls were then slit on a film slitter and tested for properties.

EXAMPLE 5

A process similar to Example 4 was repeated except that the tie-resin used in the metal receiving layer (A) was changed to Arkema Lotader® 4210 ethylene polar terpolymer at 20 wt % of the layer.

COMPARATIVE EXAMPLE 1

A process similar to Example 1 was repeated except that the metal receiving layer (A) was changed to about 100 wt % NatureWorks® 4032D PLA.

COMPARATIVE EXAMPLE 2

A commercially available 17.5 μm 3-layer coextruded and metallized biaxially oriented polypropylene film produced by Toray Plastics (America), Inc. under the tradename "PWX3" was compared, using its typical values for barrier properties. The metal receiving layer (A) of about 1 μm thickness and core layer (B) of about 15 μm thickness included about 100 wt % of propylene homopolymer or "mini-random" homopolymer. The third layer (C) of about 1.5 μm thickness included about 100 wt % of a heat sealable ethylene-propylene-butene copolymer containing 4000 ppm of a nominal 2.0 μm crosslinked silicone polymer antiblock.

The metallized properties of the Examples ("Ex") and Comparative Examples ("CEx.") are shown in Table 1. Unmetallized versions of representative Examples and Comparative Examples were tested for degradability under ASTM test procedure D-6400 for compostable plastics. Degradation results are shown after the test was partially completed at 65 days in Table 2 and FIGS. 1-4.

TABLE 2

| | 65 days aging under ASTM D6400 degradability Observer Comments | Interpretation |
|---|---|---|
| Ex 1 | Fragmenting, turning brown, white deposits forming, opacifying, brittle | Sample is degrading |
| Ex 4 | Fragmenting, turning brown, gauze-like appearance including holes, brittle | Sample is degrading |
| CEx 1 | In pieces less than 1 mm in size, basically gone | Sample degraded |
| CEx 2 | Unchanged from beginning of test, shiny, undamaged, transparent, intact, flexible | No degradation |

As Table 1 shows, Comparative Example 1 (CEx. 1), which is a control film using crystalline PLA Natureworks® 4032D at 100 wt % of the core layer (B) and metal receiving layer (A) and substantially 100 wt % amorphous PLA Natureworks® 4060D for the sealant layer (C), had relatively poor moisture barrier of 1.20 g/m$^2$/day. Oxygen barrier was good at about 25 cc/m$^2$/day. CEx. 1—being composed of about 100 wt % PLA biopolymer—and exhibited excellent degradability after 65 days exposure per ASTM D6400 disintegration conditions D-5338 as shown in Table 2 and FIG. 3.

Comparative Example 2 (CEx. 2) shows a second control film that includes 100 wt % propylene homopolymer and propylene copolymers of the entire film. Typical moisture and oxygen barrier is excellent at 0.15 g/m$^2$/day and 15.5 cc/m$^2$/day, respectively as shown in Table 1. Degradability under ASTM D6400 after 65 days, however, is practically non-existent and the film has basically remained unchanged as shown in Table 2 and FIG. 4. This is not surprising as CEx 2 is composed substantially of 100 wt % petroleum-based polymers. It is not expected that CEx. 2 will degrade at all when the ASTM D6400 test is completed at the 180-day mark.

Examples 1-3 (Ex 1-3) are embodiments of 4-layer coextruded film designs using different tie-resin layers and polyolefin metal receiving layer compositions. As Table 1 shows, these Examples exhibited very good improvements in moisture barrier, being under 1.0 g/m$^2$/day, with values below 0.5 g/m$^2$/day. Oxygen gas barrier was also good, being below 31 cc/m$^2$/day. Degradability under disintegration test conditions

TABLE 1

| | Example Layer Composition (wt % of layer) | | | | | | Bio-resin | |
|---|---|---|---|---|---|---|---|---|
| | Layer A metal-receiving | Layer D tie-layer | Layer B core | Layer C heat seal | MVTR g/m$^2$/day | O2TR cc/m$^2$/day | content (wt %) | Degradable* |
| Ex. 1 | PP Total 3576X (100%) | Bynel 3860 (100%) | PLA 4032D (70%) PLA 4060D (30%) | PLA4060D (94%) bl-698585 (6%) | 0.44 | 28.6 | 90 | Yes |
| Ex. 2 | PP Total 3576X (80%) EPC Total 8573 (20%) | Same as Ex 1 | Same as Ex 1 | same as Ex 1 | 0.25 | 29.3 | 90 | Yes |
| Ex. 3 | Same as Ex 2 | Orevac 18390 | Same as Ex 1 | same as Ex 1 | 0.36 | 24.3 | 90 | Yes |
| Ex. 4 | PP Total 3576X (80%) tie Fusabond 353D (20%) | NA | PLA 4032D (70%) PLA 4060D (30%) | PLA4060D (94%) bl-698585 (6%) | 0.80 | 46.3 | 94.3 | Yes |
| Ex. 5 | PP Total 3576X (80%) tie Lotader 4210 (20%) | NA | same as Ex 4 | same as Ex 4 | 0.73 | 29.0 | 94.3 | Yes |
| CEx. 1 | PLA 4032D (100%) | NA | same as Ex 1 | same as Ex 1 | 1.20 | 25.2 | 100 | Yes |
| CEx. 2 | PP (100%) | NA | PP (100%) | EPB copolymer (100%) | 0.15 | 15.5 | 0 | No |

*Per ASTM test procedure D-6400 of D-6400 (sub-group D-5338) shows that these Examples are showing fragmentation and strong signs of degradation after 65 days aging in Table 2 and FIG. 1. As these Examples are composed of about 90 wt % PLA biopolymer, this degradation was expected. It is expected that when the test is completed to 180 days, these Examples will have completely degraded.

Examples 4-5 (Ex. 4-5) are embodiments of 3-layer coextruded films using different tie-resins blended in with the polyolefin metal receiving layer. As Table 1 shows, these Examples exhibited satisfactory improvements in moisture barrier, being under 1.0 g/m²/day. Oxygen gas barrier was also satisfactory, being below 46.5 cc/m²/day. Degradability under disintegration test conditions of D-6400 (sub-group D-5338) shows that these Examples are showing fragmentation and strong signs of degradation after 65 days aging in Table 2 and FIG. 2. As these Examples are composed of about 94 wt % PLA biopolymer, this degradation was expected. It is expected that when the test is completed to 180 days, these Examples will have completely degraded.

Thus, of the foregoing Examples and Comparative Examples, only the inventive Examples which used a novel combination of a polyolefin-based metal receiving layer combined with a tie-resin blend or tie-resin layer, and a PLA biopolymer core layer demonstrate the desired improvement in moisture barrier while maintaining a high percentage of biopolymer (90 wt % or more) and desirable degradable properties. These attributes make the inventive Examples suitable for "green" packaging applications.

Test Methods

The various properties in the above examples were measured by the following methods:

Moisture transmission rate of the film was measured by using a Mocon PERMATRAN 3/31 unit substantially in accordance with ASTM F1249. In general, preferred values of MVTR would be less than 1.0 g/m²/day and preferably 0.5 g/m²/day or less at 100 1F (38° C.) and 90% relative humidity.

Oxygen transmission rate of the film was measured by using a Mocon OXTRAN 2/20 unit substantially in accordance with ASTM D3985. In general, preferred values of $O_2TR$ would be equal or less than 46.5 cc/m²/day and preferably 31 cc/m²/day or less at 73° F. (23° C.) and 0% relative humidity.

Bio-resin content of the film was calculated by taking the percentage of bio-polymer resin content versus non-bio-polymer resin content of the desired film design.

Degradability of the film was measured substantially in accordance with ASTM procedure D-6400 "Compostable Plastics," sub-group procedure D-5338 "Disintegration Test." This ASTM procedure is also known as ISO 1629 in the International Standards test procedures. In essence, the test films are aged under composting conditions of 58° C. for 180 days maximum duration in a compost medium and films are observed and rated for disintegration.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed as new and desired to be protected by Letters Patent of the United States is:

1. A coextruded multilayer film comprising:
    a core layer consisting essentially of polylactic acid;
    a polyolefin skin layer comprising at least 50 wt % polyolefin, wherein the polyolefin skin layer is coextruded with the core layer; and
    a metal layer on the polyolefin skin layer.

2. The film of claim 1, wherein the polyolefin skin layer comprises polar polyolefin.

3. The film of claim 1, wherein the film comprises at least 50 wt % polylactic acid.

4. The film of claim 1, wherein the film has a moisture barrier property of at least 1.0 g/m²/day or better at 38° C. and 90% relative humidity.

5. The film of claim 1, wherein the film has an oxygen barrier of at least about 46.5 cc/m²/day at 23° C. and 0% relative humidity.

6. A multilayer film comprising:
    a core layer consisting essentially of polylactic acid;
    a tie layer comprising a polar polyolefin;
    a skin layer comprising polyolefin, wherein the multilayer film comprises at least 50 wt % polylactic acid; and
    a metal layer on the skin layer.

7. The film of claim 6, wherein the core layer, the tie layer, and the skin layer are coextruded.

8. The film of claim 6, wherein the tie layer comprises at least 50 wt % polar polyolefin.

9. The film of claim 6, wherein the skin layer comprises at least 50 wt % polyolefin.

10. The film of claim 6, wherein the film has a moisture barrier property of at least 1.0 g/m²/day or better at 38° C. and 90% relative humidity.

11. The film of claim 6, wherein the film has an oxygen barrier of at least about 46.5 cc/m²/day at 23° C. and 0% relative humidity.

12. A method of making a multilayer film comprising:
    coextruding a core layer consisting essentially of polylactic acid and a polyolefin skin layer comprising at least 50 wt % polyolefin, wherein the multilayer film comprises at least 50 wt % polylactic acid; and
    depositing a metal layer on the polyolefin skin layer.

13. The method of claim 12, further comprising co-extruding a tie layer comprising a polar polyolefin between the core layer and the skin layer.

14. The method of claim 12, wherein the polyolefin skin layer comprises polar polyolefin.

15. The method of claim 12, wherein the film has a moisture barrier property of at least 1.0 g/m²/day or better at 38° C. and 90% relative humidity.

16. The method of claim 12, wherein the film has an oxygen barrier of at least about 46.5 cc/m²/day at 23° C. and 0% relative humidity.

17. A method of making a multilayer film comprising:
    coextruding a core layer consisting essentially of polylactic acid, a tie layer comprising a polar-modified polyolefin, and a skin layer comprising polyolefin, wherein the multilayer film comprises at least 50 wt % polylactic acid and depositing a metal layer onto the skin layer.

* * * * *